US006647534B1

(12) United States Patent
Graham

(10) Patent No.: US 6,647,534 B1
(45) Date of Patent: Nov. 11, 2003

(54) METHOD AND SYSTEM FOR ORGANIZING DOCUMENT INFORMATION IN A NON-DIRECTED ARRANGEMENT OF DOCUMENTS

(75) Inventor: Jamey Graham, Los Altos, CA (US)

(73) Assignee: Ricoh Company Limited (JP)

(*) Notice: Subject to any disclaimer, the term of this patent is extended or adjusted under 35 U.S.C. 154(b) by 0 days.

(21) Appl. No.: 09/343,977

(22) Filed: Jun. 30, 1999

(51) Int. Cl.⁷ .......................... G06F 15/00; G06F 17/00
(52) U.S. Cl. ..................... 715/526; 715/501.1; 715/513; 345/764
(58) Field of Search .............................. 707/513, 501.1, 707/526; 715/501.1, 513, 526; 345/764

(56) References Cited

U.S. PATENT DOCUMENTS

| 4,417,239 A | 11/1983 | Demke et al. ............... 345/856 |
| 4,823,303 A | 4/1989 | Terasawa ..................... 707/515 |
| 5,153,831 A | 10/1992 | Yianilos ..................... 707/531 |
| 5,309,359 A | 5/1994 | Katz et al. .................. 707/102 |
| 5,349,658 A | 9/1994 | O'Rourke et al. .......... 345/839 |

(List continued on next page.)

FOREIGN PATENT DOCUMENTS

| EP | 378 848 A2 | 7/1990 |
| EP | 737 927 A2 | 10/1996 |
| EP | 762 297 A2 | 3/1997 |
| EP | 802 492 A1 | 10/1997 |
| GB | 2 137 788 A | 10/1984 |

(List continued on next page.)

OTHER PUBLICATIONS

Gliedman, J., "Virtual Office Managers," Computer Shopper, vol. 18, No. 9, p. 290–294, (Sep. 1998).
"c:\. . .\9149920c.wpd—unmodified" Screen Shots of document created in Corel WordPerfect, 4 pages, (Apr. 30, 2002).
Begole et al., "Supporting Worker Independence in Collaboration Transparency," doc. ID: ncstrl.vatech_cs/TR–98–12, Virginia Polytechnic Institute and State University (1998).
Begole et al., "Flexible Collaboration Transparency," doc. ID: ncstrl.vatech_cs/TR–98–11, Virginia Polytechnic Institute and State University (1998).

(List continued on next page.)

Primary Examiner—Joseph H. Feild
Assistant Examiner—Almari Romero
(74) Attorney, Agent, or Firm—Townsend and Townsend and Crew LLP

(57) ABSTRACT

A graphical user interface that presents information about documents organized in a non-directed arrangement to the user is provided by the present invention. In an exemplary embodiment, methods and systems including a graphical user interface for browsing or searching one or more documents are provided. The graphical user interface can provide information about content of a current page, previously viewed pages and pages that can be viewed by traversing various hypertext links. The invention can be embodied in computer systems that include user input devices, processors, displays, storage and the like.

32 Claims, 9 Drawing Sheets

U.S. PATENT DOCUMENTS

| | | | | |
|---|---|---|---|---|
| 5,384,703 | A | | 1/1995 | Withgott et al. ............ 707/531 |
| 5,404,295 | A | | 4/1995 | Katz et al. .................... 707/12 |
| 5,418,948 | A | | 5/1995 | Turtle ............................ 707/4 |
| 5,442,795 | A | | 8/1995 | Levine et al. ............... 345/775 |
| 5,479,600 | A | | 12/1995 | Wroblewski et al. ....... 345/787 |
| 5,557,794 | A | * | 9/1996 | Matsunaga et al. ............ 707/3 |
| 5,596,700 | A | | 1/1997 | Darnell et al. .............. 707/512 |
| 5,638,543 | A | | 6/1997 | Pedersen et al. ............... 704/1 |
| 5,680,636 | A | | 10/1997 | Levine et al. .............. 707/512 |
| 5,694,559 | A | | 12/1997 | Hobson et al. ............. 345/705 |
| 5,721,897 | A | | 2/1998 | Rubinstein et al. ........... 707/2 |
| 5,737,599 | A | | 4/1998 | Rowe et al. .................. 707/10 |
| 5,748,805 | A | | 5/1998 | Withgott et al. ............ 382/306 |
| 5,751,283 | A | | 5/1998 | Smith .......................... 345/798 |
| 5,751,287 | A | | 5/1998 | Hahn et al. .................. 345/775 |
| 5,761,655 | A | | 6/1998 | Hoffman ........................ 707/4 |
| 5,778,397 | A | | 7/1998 | Kupiec et al. .............. 707/500 |
| 5,781,785 | A | * | 7/1998 | Rowe et al. ................. 715/513 |
| 5,784,616 | A | | 7/1998 | Horvitz ....................... 709/102 |
| 5,818,446 | A | | 10/1998 | Bertram et al. ............. 345/746 |
| 5,819,301 | A | * | 10/1998 | Rowe et al. ................. 715/513 |
| 5,832,474 | A | | 11/1998 | Lopresti et al. ................ 707/2 |
| 5,838,317 | A | | 11/1998 | Bolnick et al. ............. 345/764 |
| 5,857,185 | A | | 1/1999 | Yamamura ..................... 707/5 |
| 5,860,074 | A | | 1/1999 | Rowe et al. ................. 707/526 |
| 5,870,770 | A | | 2/1999 | Wolfe .......................... 345/805 |
| 5,873,107 | A | | 2/1999 | Borovoy et al. ......... 707/501.1 |
| 5,933,841 | A | | 8/1999 | Schumacher et al. ..... 707/501.1 |
| 5,943,679 | A | * | 8/1999 | Niles et al. .................. 715/526 |
| 5,946,678 | A | | 8/1999 | Aalbersberg .................... 707/3 |
| 5,950,187 | A | | 9/1999 | Tsuda ............................. 707/3 |
| 5,987,454 | A | | 11/1999 | Hobbs ............................ 707/4 |
| 6,006,218 | A | | 12/1999 | Breese et al. ................... 707/3 |
| 6,011,537 | A | * | 1/2000 | Slotznick ..................... 345/700 |
| 6,016,494 | A | * | 1/2000 | Isensee et al. .............. 707/102 |
| 6,021,403 | A | | 2/2000 | Horvitz et al. ................ 706/45 |
| 6,026,409 | A | | 2/2000 | Blumenthal ............. 707/104.1 |
| 6,028,601 | A | | 2/2000 | Machiraju et al. .......... 345/705 |
| 6,055,542 | A | | 4/2000 | Nielsen et al. ........... 707/104.1 |
| 6,094,648 | A | | 7/2000 | Aalbersberg et al. .......... 707/3 |
| 6,101,503 | A | | 8/2000 | Cooper et al. ........... 707/104.1 |
| 6,133,916 | A | * | 10/2000 | Bukszar et al. ............. 345/744 |
| 6,177,936 | B1 | * | 1/2001 | Cragun ........................ 345/760 |
| 6,182,090 | B1 | | 1/2001 | Peairs ......................... 707/500 |
| 6,263,351 | B1 | * | 7/2001 | Wolfe ...................... 707/501.1 |
| 6,275,829 | B1 | * | 8/2001 | Angiulo et al. ............... 707/10 |
| 6,289,361 | B1 | * | 9/2001 | Uchida ........................ 345/788 |
| 6,313,855 | B1 | * | 11/2001 | Shuping et al. ............. 345/738 |
| 6,369,811 | B1 | * | 4/2002 | Graham et al. ............. 345/764 |
| 6,415,320 | B1 | * | 7/2002 | Hess et al. ................... 709/219 |
| 6,421,070 | B1 | * | 7/2002 | Ramos et al. ............... 345/763 |

FOREIGN PATENT DOCUMENTS

| | | | |
|---|---|---|---|
| GB | 2 156 118 A | | 10/1985 |
| GB | 2 234 609 A | | 2/1991 |
| GB | 2 290 898 A | | 1/1996 |
| JP | 8-297677 A | | 11/1996 |

OTHER PUBLICATIONS

Boguraev et al. "Salience–based Content Characterization of Text Documents," In Proceedings of Workshop on Intelligent Scalable Text Summarization at the ACL/EACL Conference, Madrid, Spain, 12 pages (Jul. 7–12, 1997).

Taghva et al., "Evaluation of an automatic markup system," Proceedings SPIE vol. 2422, , Document Recognition II, pp. 317–327 (Mar. 1995).

Boguraev et al., "Salience–Based Content Characterisation of Text Documents," *Proceedings of the ACL/EACL Workshop on Intellegent [Sic] Scalable Text Summarization,* 1997. Topic identification, Discourse–base summarization. pp. 1–12.

Brandow et al., "Automatic Condensation of Electronic Publications by Sentence Selection," *Information Processing and Management,* 31(5):675–685 (1995).

Greenberg, et al., "Sharing fisheye views in relaxed–WYSIWIS groupware applications," *Proceedings of Graphics Interface,* Toronto, Canada, May 22–24, 1995, Distributed by Morgan–Kaufmann, pp. 28–38, http://ww.cpsc.ucalgary.ca/grouplab/papers/1996/96–Fisheye.GI/gi96 fisheye-.html.

Hearst et al., "TileBars: Visualization of Term Distribution Information in Full Text Information Access," *Proceedings of the ACM SIGCHI Conference on Human Factors in Computing Systems (CHI),* Denver, CO., May 1995, pp. 1–8, http://www.acm.org/sigchi/chi95/Electronic/documnts/papers/mah bdy htm.

Manber, U., "The Use of Customized Emphasis in Text Visualization," *Proceedings of 1997 IEEE Conf. on Information Visualization,* pp. 132–138, held Aug. 27–29, 1997 in London England.

Sumita et al., "Document Structure Extraction for Interactive Dcoument Retrieval Systems," *Proceedings of SIGDOC 93,* pp. 301–310, held Oct. 5–8, 1993 in Kitchner, Ontario.

Lam et al. "Automatic document classification based on probabilistic reasoning: model and performance analysis," IEEE 3:2719–2723 (1997).

Adobe Systems, Inc., *Adobe Photoshop 4.0 User Guide for Macintosh and Windows,* pp. 30–31; Adobe Systems, Inc., San Jose, California (1996).

Adobe Systems, Inc. three screen shot images, labeled fig. 1–3, taken from software application *Acrobat Reader 3.0* displaying the user interface; Adobe Systems, Inc., San Jose, California (1996).

Apple Computer, Inc., *Macintosh System 7 Reference Manual,* pp. 30–31; Apple Computer, Inc., Cupertino, California (1991).

Begole et al., "Flexible Collaboration Transparency," technical report from the Computer Science Department of Virginia Tech, doc. ID: ncstrl.vatech_cs/TR–98–11, entire document; Virginia Polytechnic Institute and State University, Blacksburg, Virginia (1998).

Begole et al., "Supporting Worker Independence in Collaboration Transparency." technical report from the Computer Science Department of Virginia Tech, doc. ID: ncstrl.vatech_cs/TR–98–12, entire document; Virginia Polytechnic Institute and State University, Blacksburg, Virginia (1998). Also published in *The Proceedings of the 11th annual ACM symposium on User Interface Software and Technology,* pp. 133–142, Nov. 1998, San Francisco, California (1998).

Begole, screenshots from James Begole's software application *Flexible JAMM,* available at internet site http://simon.cs.vt.edu/JAMM/index.html, entire document; Virginia Polytechnic Institute and State University, Blacksburg, Virginia (2000).

Byrd "A Scrollbar–Based Visulization for Document Navigation." *Proceedings of Fourth ACM Conference on Digital Libraries, Aug. 1999, Berkeley, California,* pp. 122–129, ACM Press (1999).

Hill et al "Edit Wear and Read Wear," *Proceedings of ACM Special Interest Group on Computer–Human Interaction*, May 1992, Montery, California (CHI '92), pp. 3–9, ACM Press (1992).

IBM Corporation "Quick Selection of Window Environment Coordinates," *Technical Disclosure Bulletin*, vol. 35, pp. 57–60; International Business Machines Corporation, Armonk, New York (1992).

Schweighofer et al., "The Automatic Generation of Hypertext Links in Legal Documents," from 7th Int. Conf., DEXA 96', Sep. 1996, Zurich, Switzerland, published in *Lecture Notes in Computer Science*, Wagner et al., eds., vol. 1134, pp. 889–898, (1996).

Taghva et al., "An Evolution of an Automatic Markup System," SPIE, vol. 2422, pp. 317–327; The International Society for Optical Engineers, Bellingham, Washington (1995).

Ball, Thomas et al., *Software Visualization in the Large*, IEEE Computer, vol. 29, No. 4, Apr. 1996. pp. 33–43.

* cited by examiner

METHOD AND SYSTEM FOR ORGANIZING DOCUMENT INFORMATION IN A NON-DIRECTED ARRANGEMENT OF DOCUMENTS

CROSS-REFERENCES TO RELATED APPLICATIONS

This application incorporates by reference the following commonly owned co-pending U.S. Patent Application in its entirety for all purposes:

U.S. patent application Ser. No. 08/995,616, Entitled, "AUTOMATIC ADAPTIVE DOCUMENT HELP SYSTEM", now abandoned.

BACKGROUND OF THE INVENTION

The present invention relates generally to user interfaces in computer systems and more particularly to a graphical user interface method and system for assisting a user with the task of viewing documents in non-directed arrangements, such as pages on the World Wide Web.

User interfaces exist for a variety of well-known Internet retrieval and display programs, called browsers. Browsers present data retrieved from the World Wide Web in a display area on a computer display screen. Browser user interfaces come in a wide variety of functional and appearance embodiments that differ from one supplier to the next. A browser interface may be customized to a certain degree but cannot be replaced completely. For example, a browser may have a menu bar or tool bar whose contents can be changed, removed or arranged differently to suit the needs or taste of the user. Also, some browser user interface components can be customized by referencing new executable code. However the basic structure of the user interface remains the same, since only specific functions can be customized.

Users can view pages on the World Wide Web by entering a URL (Uniform Resource Locator) into a field of the browser user interface. The browser will then fetch the web page corresponding to the URL from the appropriate server. Each received URL has data contents, called a web page, that are processed and presented by the browser either through use of its own facilities or through use of facilities provided by the operating system under which the browser is executing or through other applications executing concurrently. The web page can contain any mixture of text, graphic imagery, pictures, sounds and even motion picture information. Web pages also include links to other web pages. Links appear to the user as text that is highlighted in some manner, such as underlining. Each link is associated with the URL of another web page on the World Wide Web. By selecting the link with the mouse or other pointing device, the user can move to the web page corresponding to the link.

FIG. 1 depicts a representative user interface for a typical browser application program as is commonly provided for use with personal computers, work stations, multiple computers in a client server arrangement and personal digital devices. Browser applications such as the Netscape Corporation's Navigator™ or the Microsoft Corporation's Internet Explorer™ are well known in the art. The browser interface of FIG. 1 is displaying some representative data from a source associated with a URL. A user will normally employ the user interface to browse all the data content received from a source on the World Wide Web associated with a URL. The user interface is typically a static array of functionally selectable icons, scrollbars, typing fields, buttons and the like, a display area and control functions. In FIG. 1, a display screen 1 has a display area 2, shown within the dotted line, for displaying the web pages, and a user interface control area 3, which can include a plurality of buttons, such as button 5, and a plurality of pull down menus 6. A scroll bar control 4 enables the user to scroll through the page in display area 2.

Browsers commonly known in the art have user interfaces that display only one page at a time, providing little or no information about web pages that could be browsed by selecting a link from the displayed page. Attempts have been made to provide users with information about other web pages that are linked to the current web page. One approach is to provide a URL field that displays the URL associated with a link whenever the user passes the mouse pointer over the link. URL field 8 is an example of such a field. As the user moves the cursor 10 over link 7, the contents of the URL field 8 changes to reflect the URL of the link 7 to "http://www.widget.com/home.html." Another approach is to provide an "alt tag" field that contains further textual information that is displayed in a pop-up bubble when the user moves the cursor over its associated link. For example, in FIG. 1, pop-up bubble 11 displays the contents of the alt tag field, "Widget's Home Page" in response to the user's having moved cursor 10 over link 7. While these approaches provide the user with some indication of what to expect from the next web page, there is heretofore no method of giving the user a "glimpse into the future" of what the pages pointed to by the links of her page have in store.

What is needed is a method for providing users viewing a non-directed collection of documents information about documents related to the document currently being viewed.

SUMMARY OF THE INVENTION

A graphical user interface that presents information about documents organized in a non-directed arrangement to the user is provided by the present invention. In an exemplary embodiment, methods and systems including a graphical user interface for browsing or searching one or more documents are provided. The graphical user interface can provide information about content of a current page, previously viewed pages and pages that can be viewed by traversing various hypertext links. The invention can be embodied in computer systems that include user input devices, processors, displays, storage and the like.

According to one embodiment of the present invention, a method for viewing a plurality of documents in a non-directed arrangement includes a step of fetching into memory documents associated by links to a current document. The links can be Uniform Resource Locators (URL) and the like. The method includes a step of displaying the current document in a first display area on the display. A step of displaying a representation of content of at least one of the pre-fetched documents in a second display area on the display in response to a signal from the user input device is also part of the method. Such a signal can be a click of a mouse button, touch of a key on a keyboard, activation of a point on a touch screen, or the like. A step of selecting a second current document from among the pre-fetched documents in response to another signal from the user input device is also part of the method. The method also includes a step of displaying the second current document in the first display area of the display. A step of fetching into memory documents associated by links to the second current document, forming a second plurality of pre-fetched documents, is also included in the method. The method performs a step of displaying a representation of content of at least one of the second plurality of pre-fetched documents in the second display area in response to a signal from the user input device. Repeatedly performing the above steps as the user browses documents can provide a method for viewing the documents in a non-directed arrangement.

Some embodiments can also include the step of displaying a representation of content of the previously current document in a third area on the display. The third area of the display is updated with a representation of content when the user selects a new current document to view. In many embodiments, a thumb nail image can be used to represent the content of the document. In some embodiments, the thumb nail image can include highlighting of concepts of interest to the user contained within the document. A presently preferable embodiment is useful for providing viewing of pages of the world wide web. However, these embodiments can also provide viewing of other documents having Hyper Text Markup Language (HTML) format. Other embodiments can be useful for viewing documents produced by a word processing program, and the like.

In an alternative embodiment, a computer program for viewing one or more documents having a non-directed arrangement is provided. In an exemplary embodiment, the computer program is operable on computing systems comprising a user input device coupled to a processor, a display and a memory. The computer program can include code for fetching into memory documents associated by one or more links to a first current document to form a first plurality of pre-fetched documents. The computer program can also include code for displaying the first current document in a first display area on the display screen. Code for displaying a representation of content of one or more of the pre-fetched documents in a second display area on the display in response to a first signal received from the user input device can also be part of the program. Code for selecting a second current document from the pre-fetched documents in response to a second signal from the user input device is also included in the computer program. The program can also include code for displaying the second current document in the first display area of the display and code for displaying a representation of content of the first current document in a third area on the display. Code for fetching into memory documents associated by one or more links to the second current document to form a second plurality of pre-fetched documents can also be included. Additionally, code for displaying a representation of content of one or more of a second plurality of pre-fetched documents in the second display area of the display screen in response to a third signal from the user input device can also be part of the program product. By repeatedly invoking the above code as the user browses documents, the program product can provide a user interface for viewing documents arranged in a non-directed arrangement.

In another alternative embodiment, an apparatus for viewing one or more documents in a non-directed arrangement comprises a memory, a user input device, a display and a processor, operatively disposed to fetch into memory documents associated by links to a first current document, in order to form a first plurality of pre-fetched documents. The apparatus is can display the first current document in a first display area on the display and display a representation of content of one or more pre-fetched documents in a second display area on the display in response to a first signal from the user input device. The apparatus can also select a second current document from the plurality of pre-fetched documents in response to a second signal from the user input device and display the second current document in the first display area of the display. A representation of content of the first current document can be displayed in a third area on the display in some embodiments. The apparatus can fetch into memory documents associated by one or more links to the second current document, forming a second plurality of pre-fetched documents, and display a representation of content of one or more of the second plurality of pre-fetched documents in the second display area on the display in response to a third signal from the user input device. Further, the apparatus can repeatedly perform the above as the user browses documents in the plurality of documents in a non-directed arrangement.

Numerous benefits are achieved by way of the present invention over conventional techniques. The present invention can provide a way to display a large quantity of information about a plurality of web pages to a user on a single screen. Some embodiments according to the present invention are easier to use than conventional web browser user interfaces. Embodiments according to the invention can provide more information to the user than known techniques. Many embodiments according to the invention will enhance the user's web browsing experience by providing indication of which links are likely to be of most interest. These and other benefits are described throughout the present specification.

A further understanding of the nature and advantages of the inventions herein may be realized by reference to the remaining portions of the specification and the attached drawings.

DESCRIPTION OF THE SPECIFIC EMBODIMENTS

The present invention provides a graphical user interface for assisting a user with the task of viewing documents in non-directed arrangements, such as pages on the World Wide Web. In exemplary embodiments, methods and systems including a graphical user interface for browsing or searching one or more documents are provided. The graphical user interface can provide information about content of a current page, previously viewed pages and pages that can be viewed by traversing various hypertext links. The invention can be embodied in computer systems that include user input devices, processors, displays, storage and the like.

A few terms used herein will be defined at the outset. A Universal Resource Locator (URL) is a well-known element widely used in the communications systems making up the World Wide Web and it is used as an identifier to point to a specific site or location of a computer and its contents on the web. Typically, a given URL may point to a Hyper Text Markup Language (HTML) encoded page of data but it might point to a text file, an image or even a moving image stream. The browser application is an application program that requests, receives, processes and presents data that is pointed to by URLs specified by a user using the user interface. The browser application normally selects the appropriate method to process each type of data that is received and then displays an HTML page of the data. Furthermore, a browser normally moves at a user's direction from one specified URL content to another. For example, if a user selects a link in an HTML page, the browser will access the new URL location pointed to by the link.

Figure 1:
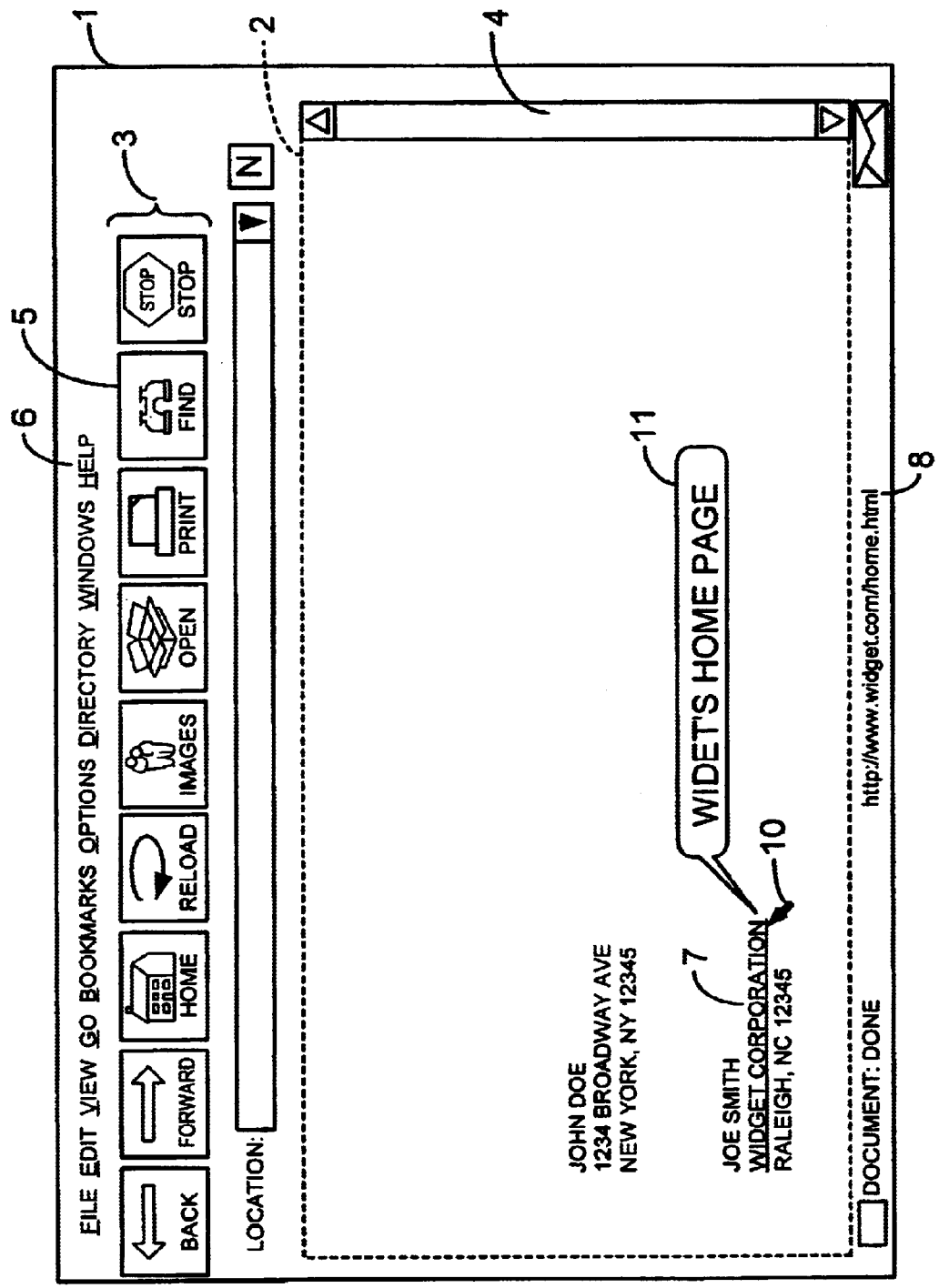
FIG. 1 illustrates the typical user interface display in a computer system running a browser application program.
Figure 2:
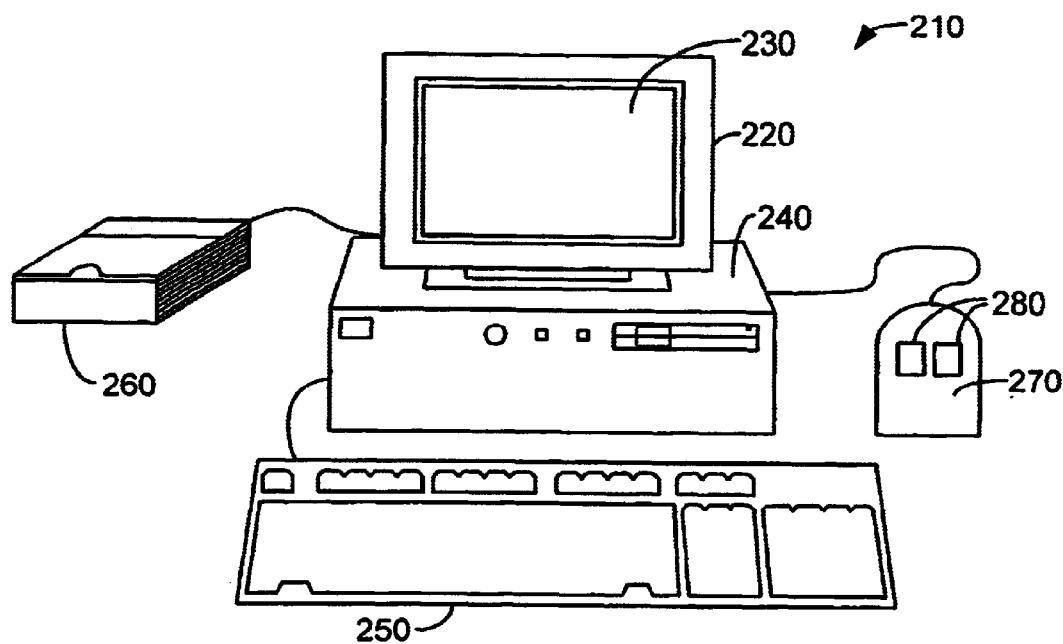
FIG. 2 is an illustration of a system in a particular embodiment according to the present invention.

FIG. 2 is an illustration of a representative system according to a particular embodiment of the present invention. This diagram is merely an example which should not limit the scope of the claims herein. One of ordinary skill in the art would recognize many other variations, alternatives, and modifications. FIG. 2 depicts but one example of many possible computer types or configurations capable of being used with the present invention. Embodiments according to the invention can be implemented in a single application program such as a browser, or may be implemented as multiple programs in a distributed computing environment, such as a workstation, personal computer or a remote terminal in a client server relationship. FIG. 2 shows computer system 210 including display device 220, display screen 230, cabinet 240, keyboard 250, scanner 260 and mouse 270. Mouse 270 and keyboard 250 are representative "user input devices." Other examples of user input devices are a touch screen, light pen, track ball, data glove and so forth. FIG. 2 is representative of but one type of system for embodying the present invention. It will be readily apparent to one of ordinary skill in the art that many system types and configurations are suitable for use in conjunction with the present invention.

In a preferred embodiment, computer system 210 includes a Pentium® class based computer, running Windows® NT operating system by Microsoft Corporation. However, the method is easily adapted to other operating systems and architectures without departing from the scope of the present invention.

Mouse 270 may have one or more buttons such as buttons 280. Cabinet 240 houses familiar computer components such as disk drives, a processor, storage means, etc. As used in this specification "storage means" includes any storage device used in connection with a computer system such as disk drives, magnetic tape, solid state memory, bubble memory, etc. Cabinet 240 may include additional hardware such as input/output (I/O) interface cards for connecting computer system 210 to external devices such as a scanner 260, external storage, other computers or additional peripherals.

Figure 3:
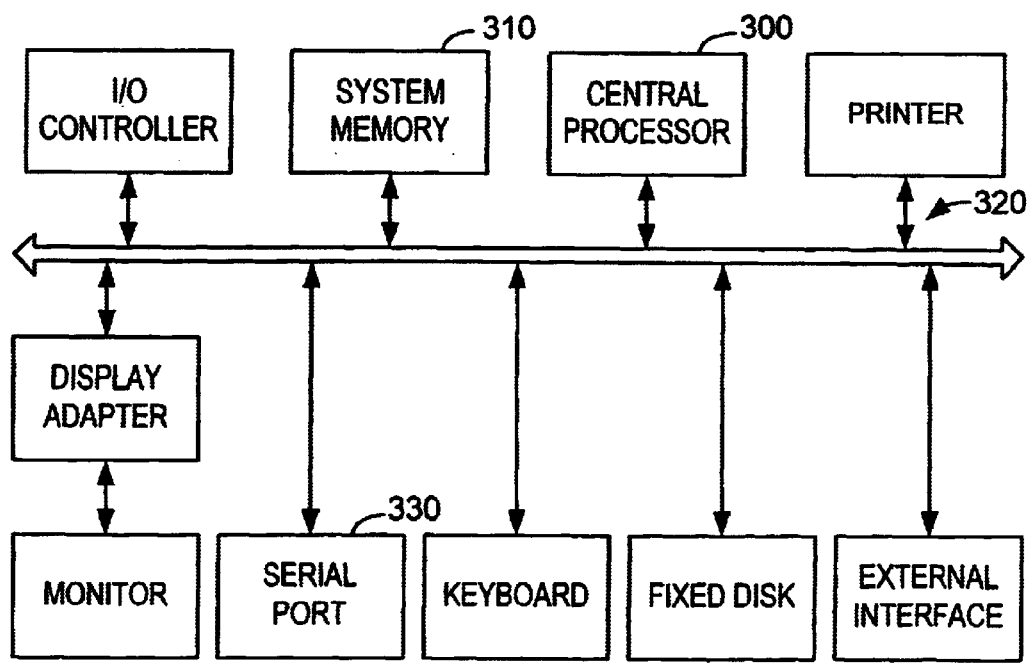
FIG. 3 is an illustration of basic subsystems of the system of FIG. 2.

FIG. 3 is an illustration of basic subsystems in computer system 210 of FIG. 2. In FIG. 3, subsystems are represented by blocks such as central processor 300, system memory 310, etc. This diagram is merely an example which should not limit the scope of the claims herein. One of ordinary skill in the art would recognize many other variations, alternatives, and modifications. The subsystems are interconnected via a system bus 320. Additional subsystems such as a printer, keyboard, fixed disk and others are shown. Peripherals and input/output (I/O) devices can be connected to the computer system by any number of means known in the art, such as serial port 330. For example, serial port 330 can be used to connect the computer system to a modem, a mouse input device, or a scanner. The interconnection via system bus 320 allows central processor 300 to communicate with each subsystem and to control the execution of instructions from system memory 310 or the fixed disk, as well as the exchange of information between subsystems. Other arrangements of subsystems and interconnections are readily achievable by those of ordinary skill in the art. System Memory 310, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Figure 4:
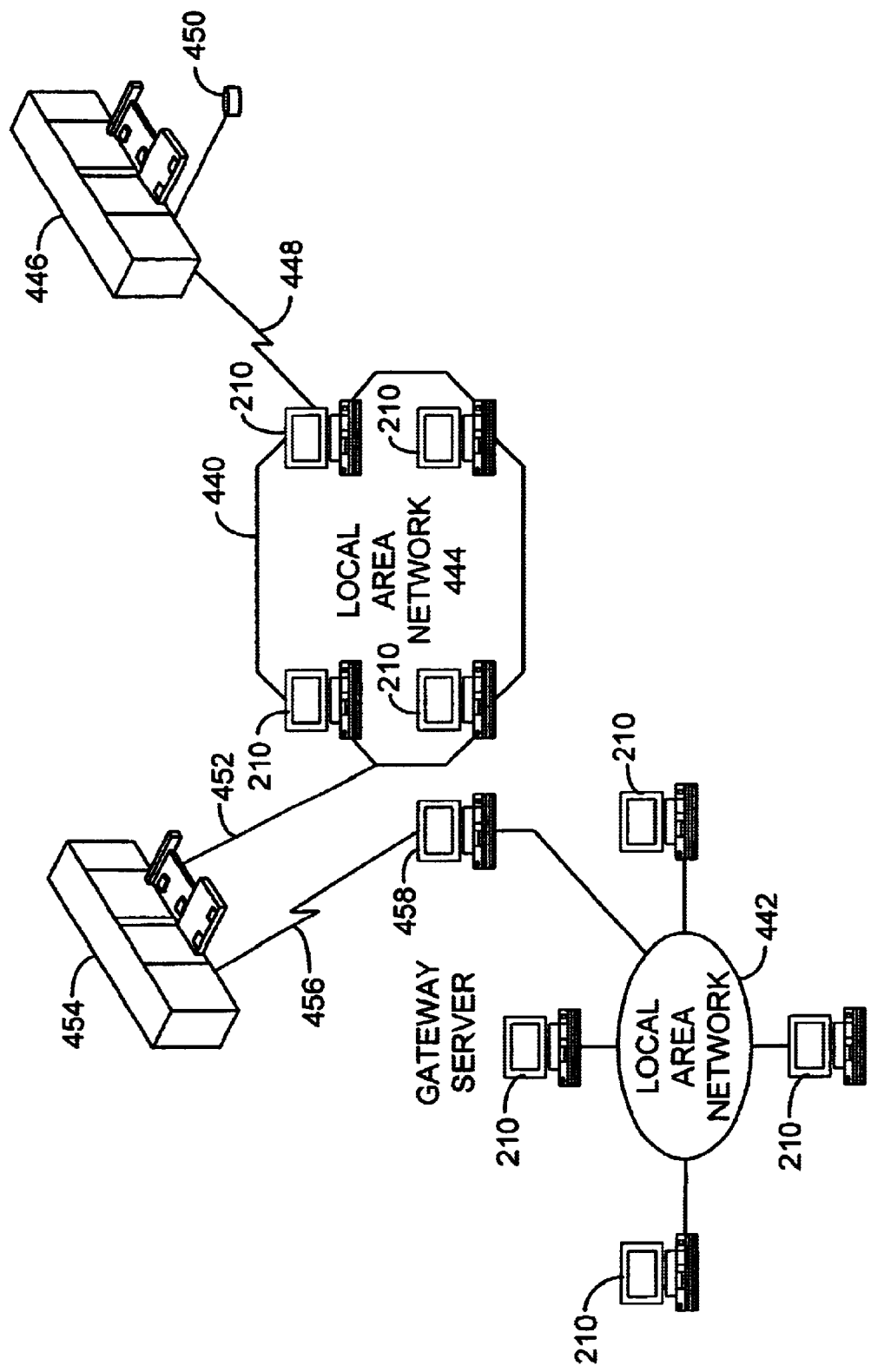
FIG. 4 illustrates a representative data communications and computer network of the sort in which a particular embodiment according to the present invention may be practiced.

FIG. 4 illustrates a representative data processing network 440. This diagram is merely an example which should not limit the scope of the claims herein. One of ordinary skill in the art would recognize many other variations, alternatives, and modifications. The data processing network 440 includes a plurality of individual networks including the LANs 442 and 444, each of which includes a plurality of individual workstations 210. Alternatively, as will be appreciated by those of ordinary skill in the art, an individual LAN 442 or 444 may comprise a number of intelligent workstations or network computers coupled to a centralized computing complex. For example, computer 446 may be connected to a LAN by means of communication link 448. The computer 446 may also be coupled to a storage device 450 which may serve as a remote central storage for LAN 444. The LAN may also be coupled to a communications link 452 through some subsystem control such as computer based controller 454 and communications link 456 to a gateway server 458 for access to other local area networks and workstations. The gateway server is preferably an individual computer or intelligent workstation and serves to link LAN 442 to LAN 444. Those of ordinary skill in the art will readily appreciate that the computer 446 may be located at a great geographic distance from the LAN 444 which in turn may be located a substantial distance from the LAN 442.

The present invention is typically embodied as software programming code which may be stored in permanent storage of some type such as the permanent storage 300 of the workstation 210. In a client server environment, however, such software programming code could be stored with the storage associated with a server such as storage 450 associated with computer 446 operating as a server as shown in FIG. 4. The software programming code embodying techniques according to the present invention can itself be implemented on any of a variety of known media for use with a data processing system such as a removable disk/ette, cassette tape, hard drive or CD ROM. The code may be distributed on such media or distributed to users from the memory or storage of one computer system over a communications network of any given type to other computer systems for use by users of such systems. The techniques and method of embodying software program code on physical media and for distributing or embodying the code via networks are well known and will not be further discussed herein.

Figure 5:
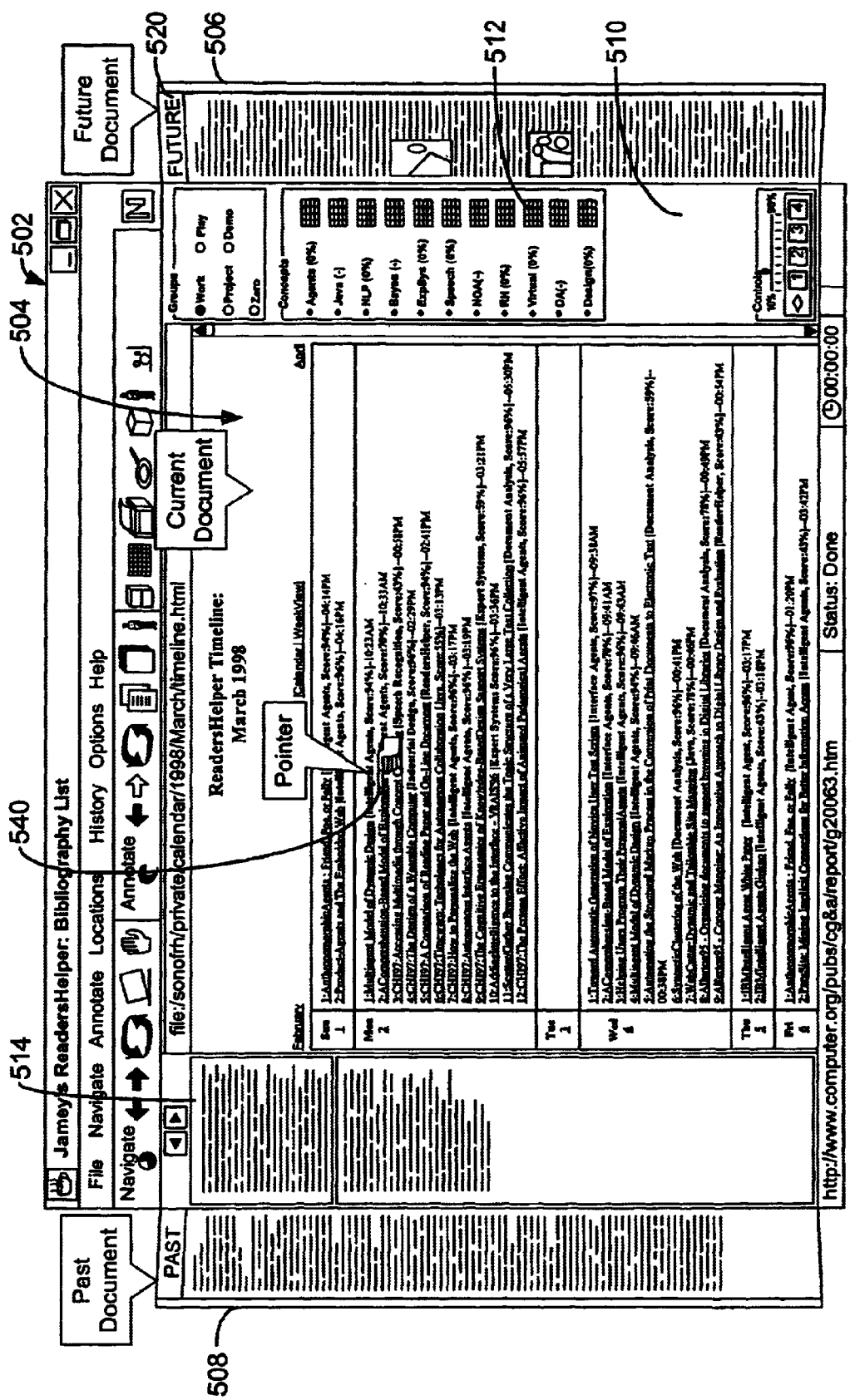
FIG. 5 illustrates a representative screen display in a particular embodiment according to the present invention.

FIG. 5 illustrates a representative browser user interface 502 which can be displayed on display screen 230 of FIG. 2, according to a particular embodiment of the present invention. This diagram is merely an example which should not limit the scope of the claims herein. One of ordinary skill in the art would recognize many other variations, alternatives, and modifications. Browser user interface 502 includes a first display area 504, in which the "current document," the document that the reader is currently focusing her attention upon, is displayed. Adjacent to first display area 504 is a second display area 506, in which representations of content of pre-fetched documents may be displayed. Also adjacent to first display area 504 is a third display area 508, in which representations of content of a previously current document can be displayed. The representations of content may comprise any information about the document it relates to, such as summaries, titles, icons compressed images, etc., but in a presently preferable embodiment, the representation of content is a thumb nail depiction of the entire document. Reference may be had to a commonly owned, co-pending U.S. patent application Ser. No. 08/995, 616, entitled, "AUTOMATIC ADAPTIVE DOCUMENT HELP SYSTEM," incorporated herein by reference in its entirety for all purposes, for a detailed explanation of producing a thumb nail image of a document. A concept indicator bar 510 that includes a plurality of concept indicators, such as concept indicator 512 and a thumb nail representation of the current document 514 may optionally be included in browser user interface 502. Some embodiments can also include items such as a menu bar, a status bar, one or more tool bar buttons, a horizontal scroll bar and a vertical scroll bar without departing from the scope of the present invention. Each display area can also include a text title field such as text field 520 having a title "Future."

A cursor 540 is manipulated by the mouse (not shown) to select, position, activate and otherwise manipulate the images on the screen. As illustrated in FIG. 5, the present invention contemplates that the representation of document content displayed in the second display area 506 will change as the user moves the mouse or other pointing device over links in the current document displayed in the first display area. As described, the browser user interface 502 provides an easy and intuitive way for users to select documents to view based upon information displayed from pre-fetching documents linked by the current document. The presently preferred embodiment of the invention contemplates any number of pre-fetched document representations.

Figure 6:
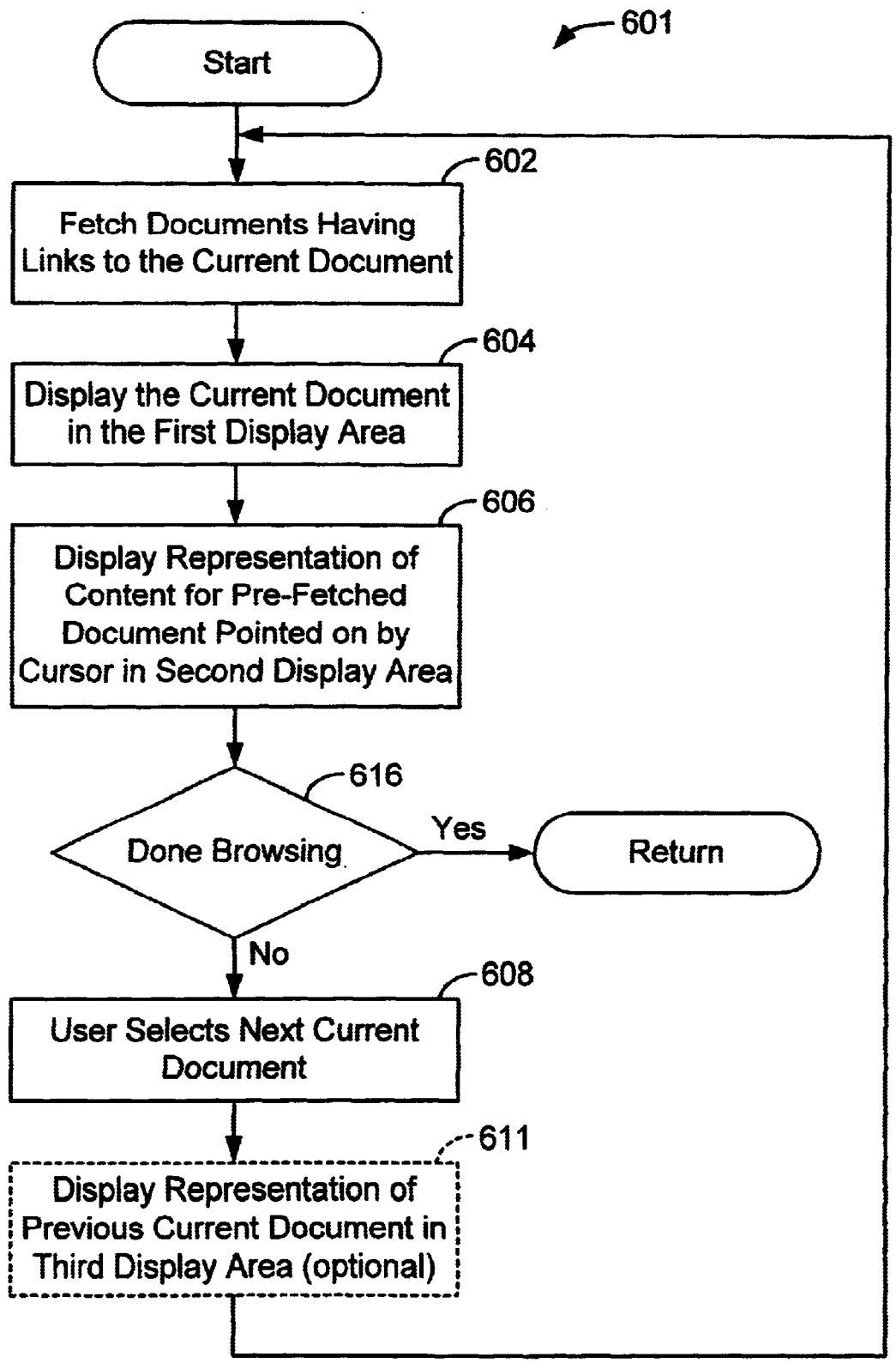
FIG. 6 illustrates a simplified flowchart of representative process steps in a particular embodiment according to the present invention.

FIG. 6 illustrates a flowchart 601 of simplified process steps in a particular representative embodiment according to the invention for viewing a plurality of documents arranged in a non-directed way. This diagram is merely an example which should not limit the scope of the claims herein. One of ordinary skill in the art would recognize many other variations, alternatives, and modifications. The method is preferably embodied as software processes executing in a computer system that includes a user input device coupled to a processor, a display and a memory. In a step 602, documents associated with a current document by one or more links are fetched into the memory of the computer in order to form a plurality of pre-fetched documents. Then, in a step 604, the current document is displayed in first display area 504 on the display screen 230 of the computer. Next, in a step 606, a representation of content of at least one of the pre-fetched documents is displayed in second display area 506 on the display in response to a signal from the user input device.

Decisional step 616 enables the user to terminate the browsing session. If the user wishes to continue browsing, then in a step 608, a second current document is selected from among the pre-fetched documents in response to a second signal from the user input device. Optionally, a step 611 can be included which displays a representation of content of the first current document in a third display area 508 on the display. Then, in step 602, the second current document is displayed in the first display area 504 of the display. The method can repeatedly perform steps 602 to 608, and optionally step 611, as the user browses documents. The steps of this method can enable the viewer to more easily view documents arranged in a non-directed way.

FIGS. 7A–7D illustrate representative screens in a search example in a particular embodiment according to the present invention. In the search example of FIGS. 7A–7D, a user is using an exemplary embodiment to learn about Information Visualization. Other references about these topics, as well as other topics can be viewed using various embodiments according to the present invention. Thus, the screens of FIGS. 7A–7D are intended to exemplary and not limiting.

Figure 7A:
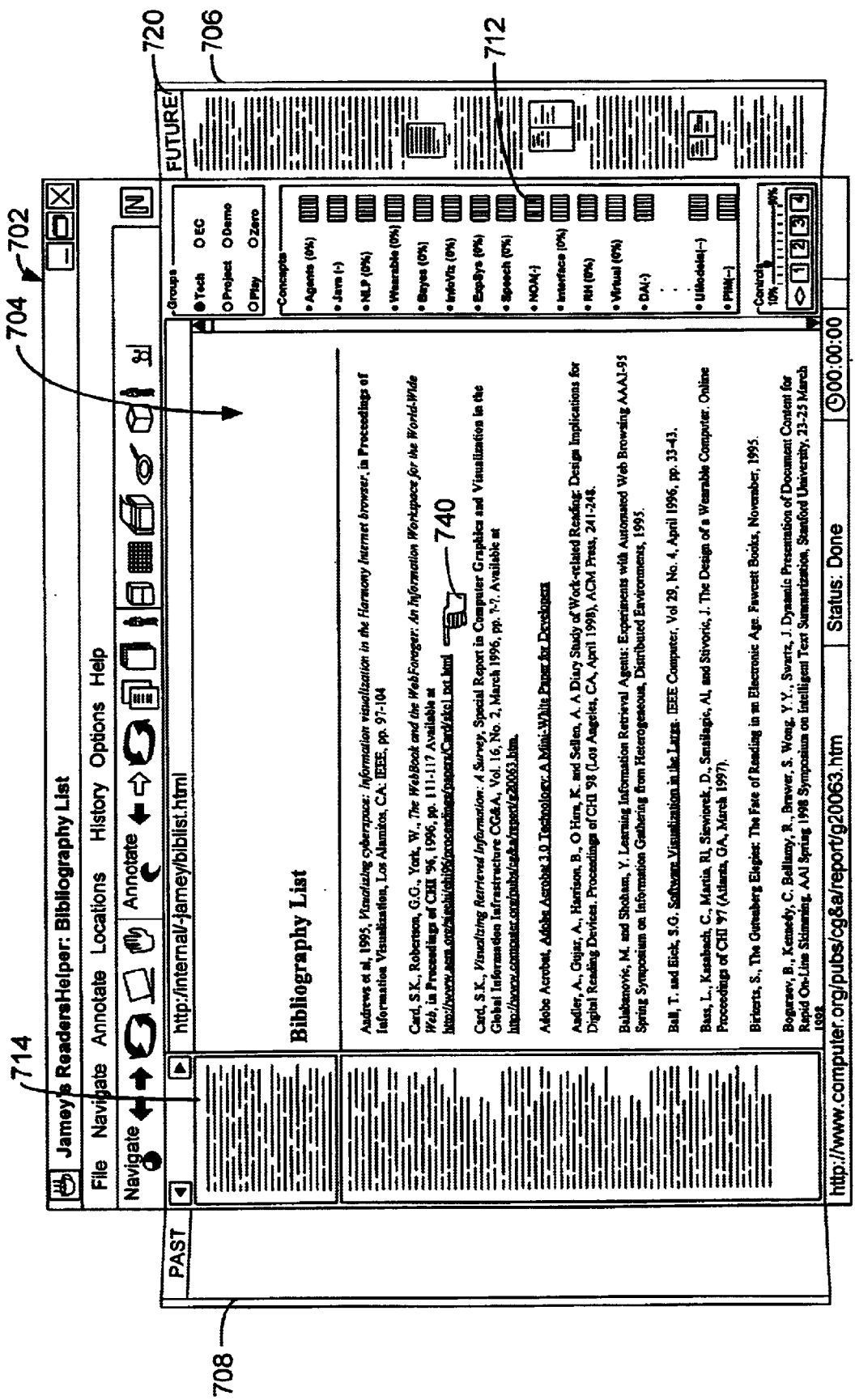
FIGS. 7A–7D illustrate a representative example of browsing in a particular embodiment according to the present invention.

FIG. 7A illustrates a representative screen in an example search or browsing of a biographical list of references in a particular embodiment according to the present invention. This diagram is merely an example which should not limit the scope of the claims herein. One of ordinary skill in the art would recognize many other variations, alternatives, and modifications. FIG. 7A illustrates a biographical listing of references in a display area 704. FIG. 7A further comprises a future document area 720 for displaying information about the contents of a document of interest indicated pointed on by a pointer 740. Further, FIG. 7A illustrates a plurality of concept indicators 712 that indicate the strength of a particular subject in the document in display area 704. In an alternative embodiment, plurality of concept indicators 712 can indicate the strength of a particular subject within a document having a URL pointed on by pointer 740. A sliding window 714 enables the reader to view an indication of the subject matter of the current document, entitled, *Bibliography List*, displayed in current document display area 704. The reader has positioned pointer 740 on a URL corresponding to a document entitled *The Web Book And The Web Forager: An Information Workspace For The World-Wide Web*. This has caused document content indicators 712 to indicate a plurality of information about the persistence of various concepts in the document *The Web Book And The Web Forager: An Information Workspace For The World-Wide Web*. Further, future document display area 720 provides an indication of the content of the document *The Web Book And The Web Forager: An Information Workspace For The World-Wide Web*. A previous document display area 708 is available to provide an indication of content of a prior document. In FIG. 7A, previous document display area 708 is blank because the current document, *Bibliography List*, is the starting point for this particular example. The user can click on the URL pointed on by pointer 740 to move to the document entitled *The Web Book And The Web Forager: An Information Workspace For The World-Wide Web*.

Figure 7B:
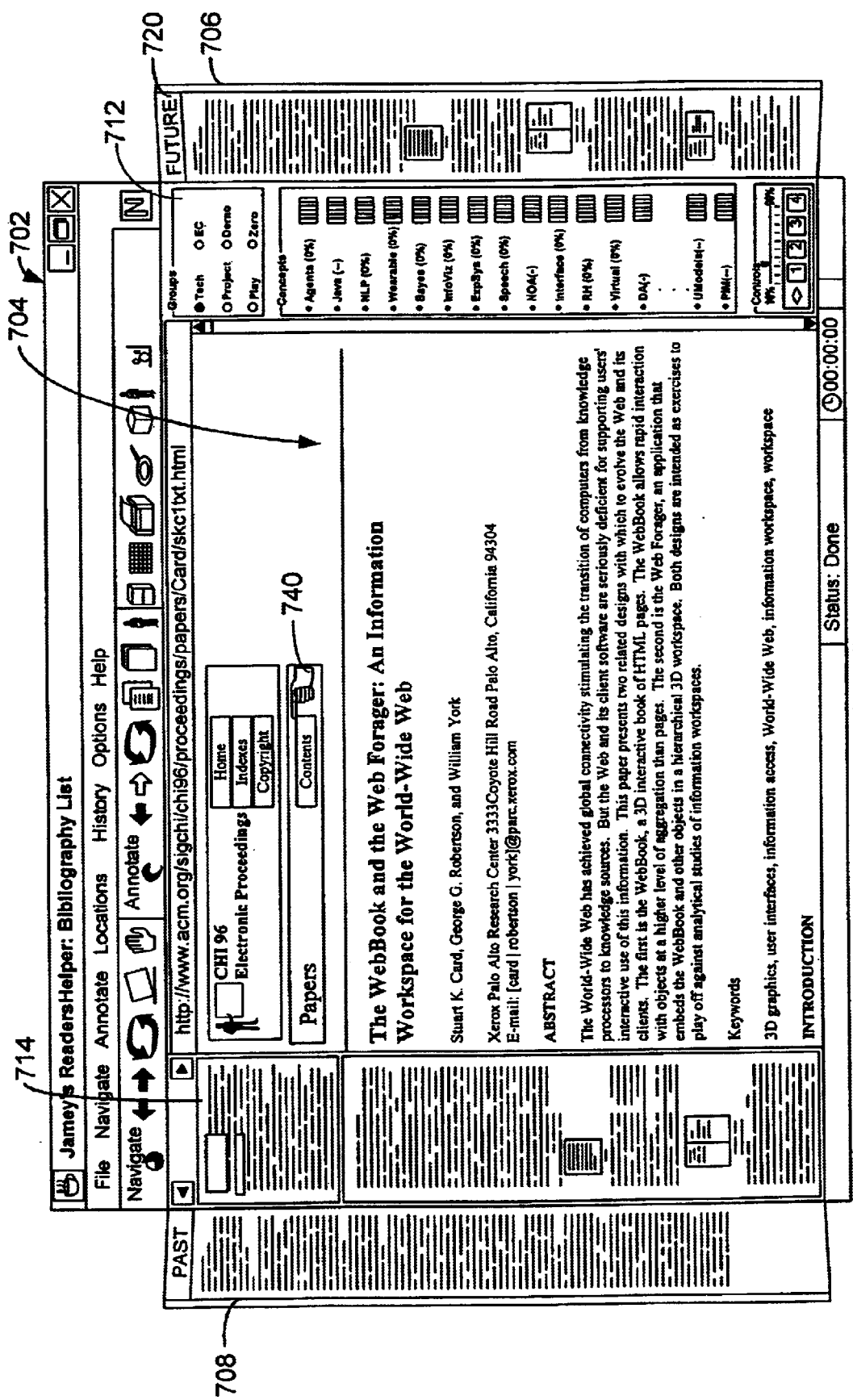

FIG. 7B illustrates another representative screen in the example search or browsing of a biographical list of references in a particular embodiment according to the present invention. This diagram is merely an example which should not limit the scope of the claims herein. One of ordinary skill in the art would recognize many other variations, alternatives and modifications. FIG. 7B illustrates the display viewing area 702 of FIG. 7A in which a new document has become the current document as a result of the user selecting the new document's URL with pointer 740 in FIG. 7A. The new document, entitled, *The Web Book And The Web Forager: An Information Workspace For The World-Wide Web*, is displayed in the current document display area 704 of FIG. 7B. Concept indicators 712 now indicate the presence of the concepts in the now current document displayed in current document display area 704. Further, slidable indicator 714 provides an indication of the contents of current document in display area 704. Yet further, future document area 720 has been updated to illustrate the content of a future document pointed on by pointer 740 in FIG. 7B. Pointer 740 now points to a "contents" button in current document displayed in display area 704. Previous document display area 708 now provides an indication of content of the prior current document previously displayed in area 704 in FIG. 7A. The user can select a portion of the document having a hypertext link (i.e., a URL) using pointer 740 to move to the paper described by the contents of the current document of FIG. 7B. In the example document in display area 704 of FIG. 7B, the active area is the "contents" button.

In a particular embodiment, a user can move from the current document to a previously displayed document by clicking on the previous document display area. For example, in FIG. 7B, a user can return to the previously displayed document by moving pointer 740 over to previous document display area 708 and clicking it.

Figure 7C:
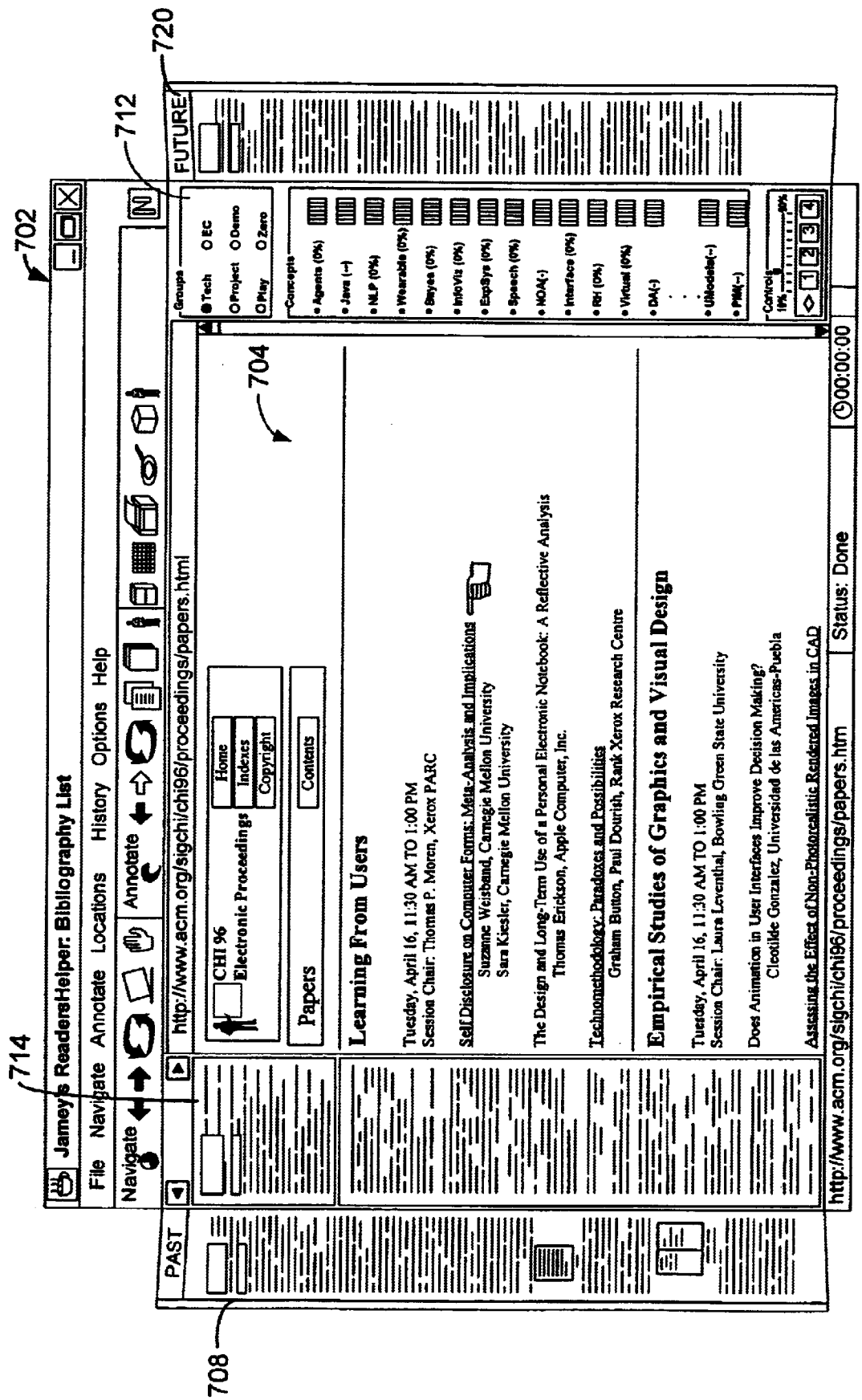

FIG. 7C illustrates a further representative screen in an example search or browsing of a biographical list of references in a particular embodiment according to the present invention. This diagram is merely an example, which should not limit the scope of the claims herein. One of ordinary skill in the art would recognize many other variations, alternatives and modifications. FIG. 7C illustrates current document display area 704 having a new document, entitled *Self Disclosure on Computer Forms: Meta-Analysis and Implications*, that has been accessed by the user selecting the "contents" button on FIG. 7B with the pointer 740.

FIG. 7C illustrates a plurality of URLs including a current URL pointed on by a pointer 740. The current URL corresponds to a document entitled *Self Disclosure on Computer Forms: Meta-Analysis and Implications*. FIG. 7C illustrates in a future document section 720 an indicator of the contents of future document corresponding to the URL *Self Disclosure On Computer Forms: Meta-Analysis And Implications* pointed on by the pointer 740. Concept indicator 712 illustrates the persistence of one or more concepts in the current document 704. A sliding window indicator 714 enables the user to select the contents of the current document displayed in the current document display area 704 and also provide an indication of the contents of the remainder of the current document. Previous document area 708 illustrates an indication of the contents of the previous document which was the current document in the screen of FIG. 7B. The user can click the mouse or other pointing device to move to the document represented by *Self Disclosure on Computer Forms: Meta-Analysis and Implications* pointed on by pointer 740.

Figure 7D:
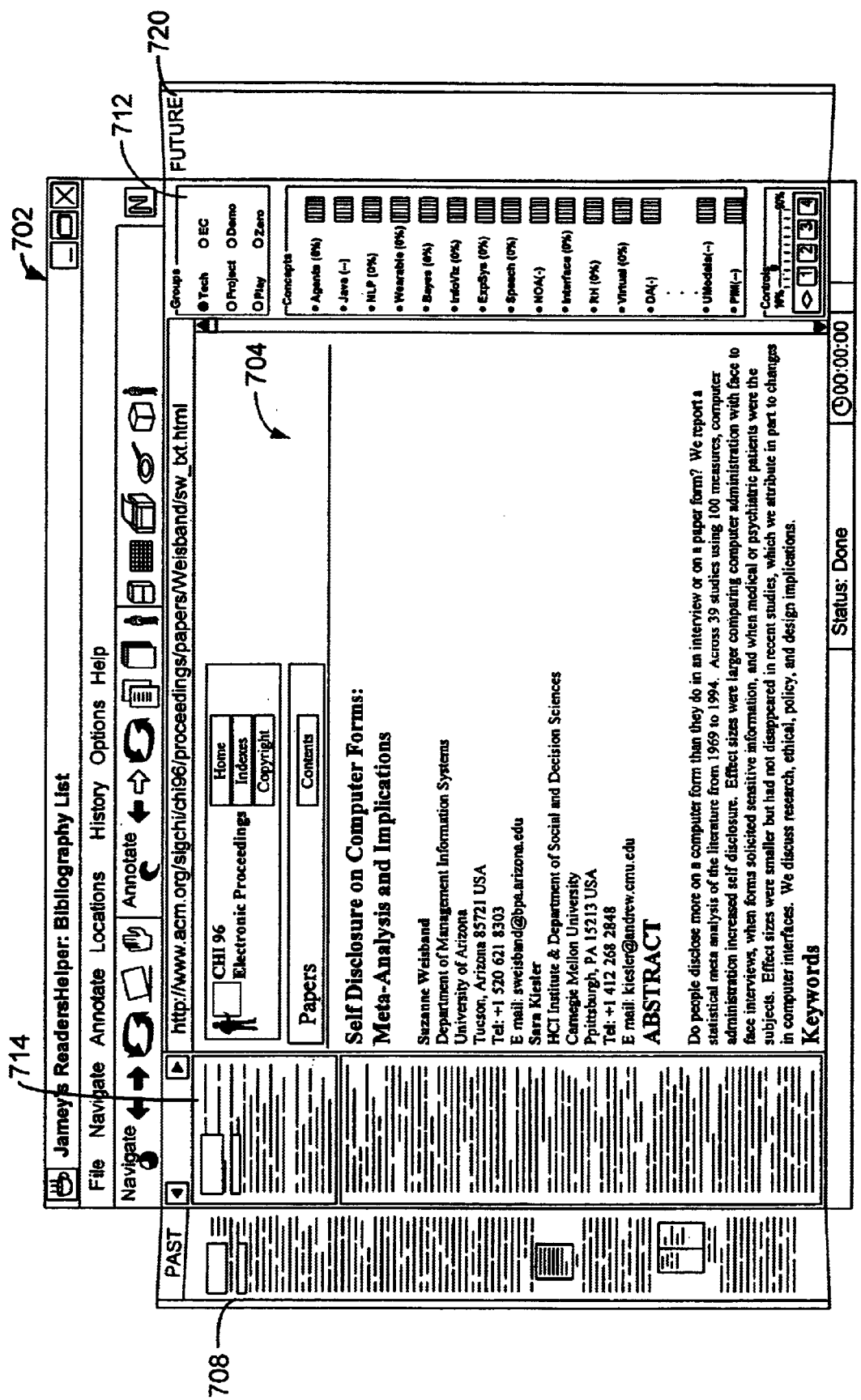

FIG. 7D illustrates a yet further representative screen in an example search or browsing of a biographical list of references in a particular embodiment according to the present invention. This diagram is merely an example, which should not limit the scope of the claims herein. One of ordinary skill in the art would recognize many other variations, alternatives and modifications. FIG. 7D illustrates a current document in current document area 704 entitled *Self Disclosure on Computer Forms: Meta-Analysis and Implications*. Because the user has not positioned a cursor over a contextually sensitive portion of the current document, future document 720 is blank. Plurality of concept indicators 712 indicate the persistence of various concepts within the current document 704. A sliding window indicator 714 enables the user to determine that portion of the current document that can be displayed in current document display area 704, as well as provide an indication of the contents of the entire document. Previous document display area 708 provides an indication of the contents of the prior document that was displayed in the current display area 704 in FIG. 7C.

By moving through the documents in this fashion, the user can search for ideas and concepts of interest in various documents arranged in a non-directed way. The current document display area 704, in conjunction with the future document display area 720 and previous document display area 708, provide the user with indications of the content of at least three documents in a single screen. Further, concept indicator 712 provides an indication of the relevance of a particular document to a plurality of previously selected concepts of interest to the user. Slidable document display area 714 enables the user to scroll through an indication of the current document's content to locate areas of discussion of particular concepts of interest to the user.

In conclusion, the present invention provides for a method of providing users viewing a non-directed collection of documents information about documents related to the document currently being viewed. In the foregoing specification, the invention has been described with reference to a specific exemplary embodiments thereof. Many changes or modifications are readily envisioned. For example, changing the size or arrangement of the document images in the display, changing the appearance and features of document images; adding audio effects when manipulating the document images, etc.; adding audio memos describing the contents of the document images, among other changes, are included within other embodiments of the present invention.

The specification and drawings are, accordingly, to be regarded in an illustrative rather than in a restrictive sense. It will, however, be evident that various modifications and changes may be made thereunto without departing from the broader spirit and scope of the invention as set forth in the claims.

What is claimed is:

1. A method, used in a computer system that includes a user input device coupled to a processor, a display and a memory, for viewing at least one of a plurality of documents in a non directed arrangement including a document selected as a current document displayed in a first display area of the display, said method comprising the steps:

(a) fetching into memory documents associated by at least one of a plurality of links to said current document, forming a plurality of pre-fetched documents;

(b) displaying a representation of content of at least one of said plurality of pre-fetched documents in a second display area of the display in response to a first signal from the user input device, without selecting said at least one of said plurality of pre-fetched documents as said current document;

(c) selecting a document as said current document from said plurality of pre-fetched documents in response to a second signal from the user input device;

(d) displaying said current document in said first display area of the display;

(e) displaying a representation of content of said document previously selected as said current document in a third area of the display; and (f) repeatedly performing said steps (a), (b), (c), (d), and (e), re-using said first, second, and third display areas of the display, as the user browses documents in said plurality of documents.

2. The method of claim 1 wherein said representation of content is a thumb nail image of the document.

3. The method of claim 2 wherein said thumb nail image further includes highlighting of concepts of interest to the user contained within the document.

4. The method of claim 1 wherein said plurality of documents in a non-directed arrangement comprises pages of the World Wide Web.

5. The method of claim 1 wherein said plurality of documents includes Hyper Text Markup Language (HTML) documents.

6. The method of claim 1 wherein said plurality of documents includes documents produced by a word processing program.

7. The method of claim 1 wherein said plurality of links comprises at least one Uniform Resource Locator (URL).

8. A method, used in a computer system that includes a user input device coupled to a processor, a display and a memory, for viewing at least one of a plurality of documents in a non-directed arrangement including a document selected as a current document displayed in a first display area of the display, said method comprising:
   (a) fetching into memory documents associated by at least one of a plurality of links to said current document, forming a plurality of pre-fetched documents;
   (b) displaying a representation of content of at least one of said plurality of pre-fetched documents in a second display area of the display in response to a first signal from the user input device, without selecting said at least one of said plurality of pre-fetched documents as said current document;
   (c) selecting a document as said current document from said plurality of pre-fetched documents in response to a second signal from the user input device;
   (d) displaying said current document in said first display area of the display; and
   (e) repeatedly performing said steps (a), (b), (c), and (d), re-using said first, second, and third display areas of the display, as the user browses documents in said plurality of documents in a non-directed arrangement.

9. A computer program product, used in a computer system that includes a user input device coupled to a processor, a display and a memory, for viewing at least one of a plurality of documents in a non-directed arrangement including a document selected as a current document displayed in a first display area of the display, said computer program product comprising:
   (a) code for fetching into memory documents associated by at least one of a plurality of links to said current document, forming a plurality of pre-fetched documents;
   (b) code for displaying a representation of content of at least one of said plurality of pre-fetched documents in a second display area of the display in response to a first signal from the user input device, without selecting said at least one of said plurality of pre-fetched documents as said current document;
   (c) code for selecting a document as said current document from said plurality of pre-fetched documents in response to a second signal from the user input device;
   (d) code for displaying said current document in said first display area of the display;
   (e) code for displaying a representation of content of said document previously selected as said current document in a third area of the display;
   (f) code for repeatedly invoking said codes (a), (b), (c), (d), and (e), re-using said first, second, and third display areas of the display, as the user browses documents in said plurality of documents in a non-directed arrangement; and
   a computer readable storage medium for holding said codes.

10. The computer program product of claim 9 wherein said representation of content is a thumb nail image of the document.

11. The computer program product of claim 9 wherein said thumb nail image further includes highlighting of concepts of interest to the user contained within the document.

12. The computer program product of claim 9 wherein said plurality of documents in a non-directed arrangement comprises pages of the World Wide Web.

13. The computer program product of claim 9 wherein said plurality of documents includes Hyper Text Markup Language (HTML) documents.

14. The computer program product of claim 9 wherein said plurality of documents includes documents produced by a word processing program.

15. The computer program product of claim 9 wherein said plurality of links comprises at least one Uniform Resource Locator (URL).

16. A computer program product, used in a computer system that includes a user input device coupled to a processor, a display and a memory, for viewing at least one of a plurality of documents in a non-directed arrangement including a document selected as a current document displayed in a first display area of the display, said computer program product comprising:
   (a) code for fetching into memory documents associated by at least one of a plurality of links to said current document, forming plurality of pre-fetched documents;
   (b) code for displaying a representation of content of at least one of said plurality of pre-fetched documents in a second display area of the display in response to a first signal from the user input device, without selecting said at least one of said plurality of pre-fetched documents as said current document;
   (c) code for selecting a document as said current document from said plurality of pre-fetched documents in response to a second signal from the user input device;
   (d) code for displaying said current document in said first display area of the display;
   (e) code for repeatedly invoking said codes (a), (b), (c), and (d), re-using said first, second, and third display areas of the display, as the user browses documents in said plurality of documents in a non-directed arrangement; and
a computer readable storage medium for holding said codes.

17. An apparatus for viewing at least one of a plurality of documents in a non-directed arrangement comprising:
   a memory,
   a user input device;
   a display adapted to display a document selected as a current document in a first display area; and
   a processor operatively disposed to:
      (a) fetch into memory documents associated by a plurality of links to said current document, to form a plurality of pre-fetched documents;
      (b) display a representation of content of at least one of said plurality of pre-fetched documents in a second display area of the display in response to a first signal from the user input device, without selecting said at least one of said plurality of pre-fetched documents as said current document;
      (c) select a document as said current document from said plurality of pre-fetched documents in response to a second signal from the user input device;

(d) display said current document in said first display area of the display;

(e) display a representation of content of said document previously selected as said current document in a third area of the display; and (f) repeatedly perform said steps (a), (b), (c), (d), and (e), re-using said first, second, and third display areas of the display, as the user browses documents in said plurality of documents in a non-directed arrangement.

18. The apparatus of claim 17 wherein said representation of content is a thumb nail image of the document.

19. The apparatus of claim 18 wherein said thumb nail image further includes highlighting of concepts of interest to the user contained within the document.

20. The apparatus of claim 17 wherein said plurality of documents in a non-directed arrangement comprises pages of the World Wide Web.

21. The apparatus of claim 17 wherein said plurality of documents includes Hyper Text Markup Language (HTML) documents.

22. The apparatus of claim 17 wherein said plurality of documents includes documents produced by a word processing program.

23. The apparatus of claim 17 wherein said plurality of links comprises at least one Uniform Resource Locator (URL).

24. An apparatus for viewing at least one of a plurality of documents in a non-directed arrangement comprising:

a memory, a user input device;

a display adapted to display a document selected as a current document in a first display area; and a processor operatively disposed to:
  (a) fetch into memory documents associated by at least one of a plurality of links to said current document, to form a plurality of pre-fetched documents;
  (b) display a representation of content of at least one of said plurality of pre-fetched documents in a second display area of the display in response to a first signal from the user input device, without selecting said at least one of said plurality of pre-fetched documents as said current document;
  (c) select a document as said current document from said plurality of pre-fetched documents in response to a second signal from the user input device;
  (d) display said current document in said first display area of the display; and
  (e) repeatedly perform said steps (a), (b), (c), and (d), re-using said first, second, and third display areas of the display, as the user browses documents in said plurality of documents in a non-directed arrangement.

25. A method for viewing a plurality of documents in a computer system that includes a user input device coupled to a processor, a display, and a memory, said method comprising the steps of:

displaying in a first display area of said display a representation of a document;

displaying in a second display area of said display a document associated with a link in said document displayed in said first display area;

fetching into memory documents associated with a plurality of links in said document displayed in said second display area to form a plurality of pre-fetched documents, including a first pre-fetched document associated with a first link and a second pre-fetched document associated with a second link;

displaying in a third display area of said display a representation of said first pre-fetched document, without selecting said first pre-fetched document for display in said second display area; and displaying in said third display area of said display a representation of said second pre-fetched document to replace said representation of said first pre-fetched document.

26. The method of claim 25 wherein said representation of said first pre-fetched document is displayed in said third display area in response to at least one signal from said user input device indicating positioning of an associated visual indicator proximate to said first link in said second display area.

27. The method of claim 25 wherein said representation of said second pre-fetched document is displayed in said third display area in response to at least one signal from said user input device indicating positioning of an associated visual indicator proximate to said second link in said second display area.

28. The method of claim 25, further comprising the steps of:

in response to at least one signal from said user input device indicating selection of a link in said document displayed in said second display area, displaying in said second display area a selected document associated with said selected link; and after said selection, displaying in said first display area a representation of said document displayed in said second display area prior to said selection.

29. The method of claim 28, further comprising the steps of:

fetching into memory documents associated with a plurality of links in said selected document displayed in said second display area to form a new plurality of pre-fetched documents, including a new first pre-fetched document associated with a first link in said selected document and a new second pre-fetched document associated with a second link in said selected document;

displaying in said third display area a representation of said new first pre-fetched document; and displaying in said third display area a representation of said new second pre-fetched document to replace said representation of said new first pre-fetched document.

30. A computer program product for viewing a plurality of documents in a computer system that includes a user input device coupled to a processor, a display, and a memory, said computer program product comprising:

code for displaying in a first display area of said display a representation of a document;

code for displaying in a second display area of said display a document associated with a link in said document displayed in said first display area;

code for fetching into memory documents associated with a plurality of links in said document displayed in said second display area to form a plurality of pre-fetched documents, including a first pre-fetched document associated with a first link and a second pre-fetched document associated with a second link;

code for displaying in a third display area of said display a representation of said first pre-fetched document, without selecting said first pre-fetched document for display in said second display area;

code for displaying in said third display area of said display a representation of said second pre-fetched document to replace said representation of said first pre-fetched document; and a computer readable storage medium for holding said codes.

31. The computer program product of claim 30, said computer program product further comprising:

code for, in response to at least one signal from said user input device indicating selection of a link in said document displayed in said second display area, displaying in said second display area a selected document associated with said selected link; and code for, after said selection, displaying in said first display area a representation of said document displayed in said second display area prior to said selection.

32. An apparatus for viewing a plurality of documents comprising:

a memory, a user input device;

a display; and a processor operatively disposed to:

display in a first display area of said display a representation of a document;

display in a second display area of said display a document associated with a link in said document displayed in said first display area;

fetch into memory documents associated with a plurality of links in said document displayed in said second display area to form a plurality of pre-fetched documents, including a first pre-fetched document associated with a first link and a second pre-fetched document associated with a second link;

display in a third display area of said display a representation of said first pre-fetched document, without selecting said first pre-fetched document for display in said second display area; and display in said third display area of said display a representation of said second pre-fetched document to replace said representation of said first pre-fetched document.

\* \* \* \* \*